(12) United States Patent
Kartha et al.

(10) Patent No.: US 8,539,545 B2
(45) Date of Patent: Sep. 17, 2013

(54) DOMAIN-BASED SECURITY POLICIES

(75) Inventors: Anoop Kartha, Sunnyvale, CA (US);
Kamil Imtiaz, San Jose, CA (US);
Ahzam Ali, Bangalore (IN); Amarnath Bachhu Satyan, Bangalore (IN);
Firdousi Zackariya, Bangalore (IN);
Nadeem Khan, Bangalore (IN); Sanjay Agarwal, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 398 days.

(21) Appl. No.: 12/841,870

(22) Filed: Jul. 22, 2010

(65) Prior Publication Data

US 2012/0023546 A1    Jan. 26, 2012

(51) Int. Cl.
*H04L 29/06* (2006.01)
(52) U.S. Cl.
USPC ............. 726/1; 726/11; 726/12; 709/223; 709/224; 709/225; 709/229
(58) Field of Classification Search
USPC ............. 726/1, 11–12; 709/223–225, 229
See application file for complete search history.

(56) References Cited

U.S. PATENT DOCUMENTS

| | | | |
|---|---|---|---|
| 6,484,261 B1 * | 11/2002 | Wiegel | 726/11 |
| 6,816,903 B1 * | 11/2004 | Rakoshitz et al. | 709/226 |
| 7,082,531 B1 * | 7/2006 | Chen et al. | 713/153 |
| 2005/0013310 A1 * | 1/2005 | Banker et al. | 370/401 |
| 2005/0240990 A1 * | 10/2005 | Trutner et al. | 726/11 |
| 2007/0266158 A1 * | 11/2007 | Bernoth | 709/225 |

* cited by examiner

*Primary Examiner* — April Y Blair
*Assistant Examiner* — Joseph Pan
(74) *Attorney, Agent, or Firm* — Shumaker & Sieffert, P.A.

(57) ABSTRACT

An example network system includes a plurality of endpoint computing resources, a business policy graph of a network that includes a set of the plurality of endpoint computing resources configured as a security domain, a set of policy enforcement points ("PEPs") configured to enforce network policies, and a network management module ("NMM"). The NMM is configured to receive an indication of a set of network policies to apply to the security domain, automatically determine a subset of PEPs of the set of PEPs are required to enforce the set of network policies based on physical network topology information readable by the NMM that includes information about the location of the endpoint computing resources and the set of PEPs within the network, and apply the network policies to the subset of PEPs in order to enforce the network policies against the set of endpoint computing resources of the security domain.

22 Claims, 16 Drawing Sheets

FIG. 4

| Object Manager | Manage Addresses | Create Address | Create Address Group | | | |
|---|---|---|---|---|---|---|
| View: Icon Grid | | | Search: | | Single | Multifile |
| Name | Type | Address | | | Name: | |
| ⊟ – Hosts-1 | Group | | | | Address: | |
| ○ Addr1 | IP | 1.1.1.1 | | | Valid: | |
| ○ Addr2 | | | | | Description: | |
| ⊞ – Group2 | Group | | | | | |
| ⊞ – All Addresses | Predefined | | | | | |
| ⊞ – All Network | Predefined | | | | | |
| ⊟ – MyGroup3 | Group | | | | | |
| ○ Addr1 | | | | | Actions | |
| ○ Addr2 | | | | | ○ Delete Address | |
| ○ Addr3 | | | | | ○ Modify Address | |
| | | | | | ○ Remove from Group | |

▽ Page 1 of 20 △

80

Object Manager } Manage Addresses } Create Address   Create Address Group

Name: [            ]
Decription: [            ]
92 — Address Type:  ● IP Address  ○ Host Name  ○ Network Prefix
94 — IP Address: [            ]
Valid Until: [            ]
Tags: [            ]

[Cancel] [Create]

Deploy Policy Wizard

Policy Name: P1
Security Domains: SD1, SD2, SD3

Device List:
☑ Device 1
☑ Device 2

| From | To | Service | Action | Settings |
|---|---|---|---|---|
| 1.1.1.1 | 2.2.2.2 | HTTP | Allow | |

☐ Device 3
☑ Device 4

[Select Devices] [View Pending Changes] [View Config]

[Back] [Next] [Deploy]

FIG. 14

DOMAIN-BASED SECURITY POLICIES

TECHNICAL FIELD

This disclosure relates to computer networks and, more particularly, securing endpoint computing resources in a computer network.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Due to increasing reliance on network-accessible computers, network security has become a major issue for organizations and individuals. To help ensure security of their computers, organizations and individuals may install security devices between public networks and their private networks. Such security devices may prevent unwanted or malicious information from the public network from affecting devices in the private network.

Example security devices include firewalls, intrusion detection and prevention ("IDP") devices, and secure socket layer (SSL) virtual private network (VPN) devices. Typically, these devices reside at an edge of a network and may be statically configured or provisioned to apply security policies of an organization or individual. When multiple security devices are deployed by an organization to protect computing devices located at various office locations, for example, an administrator typically has to design security policies for the different subnet at the various office locations. Furthermore, each security device must be statically configured or provisioned to apply the security policies. As the number of deployed security devices increases, the likelihood that the administrator will make an error increases and the amount of administrator time required to configure the security devices increases.

By grouping the security devices, an administrator may statically configure or provision multiple security devices with the same configuration information more quickly and reliably. However, the administrator must have knowledge of the network design and must determine which security devices need to be configured in order to protect particular network resources located within a private network or to protect network traffic traveling between private networks. Furthermore, if a client device moves to a different location such as a different private network, the administrator must determine which security devices are affected and reconfigure those security devices.

SUMMARY

In general, this disclosure is directed to techniques for automatically configuring policy enforcement points (e.g., security devices, intranet controllers, subscriber resource devices, or other devices) within a computer network based. For example, this disclosure describes techniques by which endpoint computing resources are segregated into a plurality of security domains and security sub-domains so as to define a business policy graph that is independent of the physical topology of the network, i.e., the policy enforcement points and the physical subnets that define the physical network topology. Network policies may then be configured and applied by a network policy manager to each security domain and sub-domain in accordance with the business policy graph without reliance on the physical network topology. In this way, any given security domain of the business policy graph may be defined in a way that includes endpoint computing resources from a single geographic location or even from two or more different geographic locations even though the endpoint computing resources are located within different subnets of the physical topology of the network as controlled by policy enforcement points within the network. The network policy manager then effectively overlays the abstract business policy graph onto the physical network topology so as to determine the proper configuration for each of the policy enforcement points that effectively define the physical network topology. That is, based on the defined business policy graph, a network policy manager automatically determines which of the policy enforcement points of the business policy graph need to be configured to enforce the network policies for each security domain, generates device-specific configuration information for each policy enforcement device that needs to be configured, and configures the policy enforcement devices based on the device-specific configuration information.

In one example, a method includes receiving business policy graph information that defines a business policy graph of a network, wherein the business policy graph comprises a set of endpoint computing resources configured as a security domain without an indication of any policy enforcement points within the network, wherein the business policy graph is independent of a physical topology of the network, and wherein each of the set of endpoint computing resources is accessible to a user to perform a computing task. The method further includes receiving an indication of a set of network policies to apply to the security domain, and automatically determining, with a network management system, a set of policy enforcement points based on physical network topology information readable by the network management system, wherein the physical network topology information includes information about the location of the set of endpoint computing resources and the set of policy enforcement points within a network. The method also includes applying, with the network management system, the network policies to the set of policy enforcement points in order to enforce the network policies against the set of endpoint computing resources of the security domain.

In another example, a network system includes a plurality of endpoint computing resources, wherein each of the plurality of endpoint computing resources is accessible to a user to perform a computing task, a business policy graph of a network, the business policy graph comprising a set of the plurality of endpoint computing resources configured as a security domain without an indication of any policy enforcement points within the network, wherein the business policy graph is independent from a physical topology of the network, a set of policy enforcement points configured to enforce network policies, and a network management module. The network management module is configured to receive an indication of a set of network policies to apply to the security domain, automatically determine a subset of policy enforcement points of the set of policy enforcement points are required to enforce the set of network policies based on physical network topology information readable by the network management module, wherein the physical network topology information includes information about the location of the plurality of endpoint computing resources and the set of policy enforcement points within a network, and apply the network policies to the subset of policy enforcement points in order to enforce the network policies against the set of endpoint computing resources of the security domain.

In another example, a computer-readable storage medium is encoded with instructions for causing one or more programmable processors to receive business policy graph information that defines a business policy graph of a network, wherein the business policy graph comprises a set of endpoint computing resources configured as a security domain without an indication of any policy enforcement points within the network, wherein the business policy graph is independent of a physical topology of the network, and wherein each of the set of endpoint computing resources is accessible to a user to perform a computing task. The computer-readable storage medium is further encoded with instructions for causing the one or more programmable processors to receive an indication of a set of network policies to apply to the security domain, and automatically determine a set of policy enforcement points based on physical network topology information readable by the network management system, wherein the physical network topology information includes information about the location of the set of endpoint computing resources and the set of policy enforcement points within the network. The computer-readable storage medium is further encoded with instructions for causing the one or more programmable processors to apply the network policies to the set of policy enforcement points in order to enforce the network policies against the set of endpoint computing resources of the security domain.

The techniques of this disclosure may provide one or more advantages. For example, by grouping endpoint computing resources into logical entities, e.g., security domains and sub-domains, so as to form an abstract business policy graph that is independent of the geographic location of those resources and the security devices of the locations, an administrator may not need to rely on or even understand the network topology when deploying network polices to the security domains. The administrator need not determine which policy enforcement points within the network need to be configured nor how to configure the policy enforcement points in order to enforce the network policies. Furthermore, grouping endpoint computing resources into security domains may also eliminate the need to manually define and apply network policies to each of the subnets within the network. In this manner, the techniques of this disclosure may reduce the complexity of managing network security and reduce the operational costs associated with managing the network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 3-11 are screen illustrations of various user interfaces for managing security domains and security policies.

FIGS. 13-15 are screen illustrations of various user interfaces for deploying security policies.

DETAILED DESCRIPTION

Figure 1:
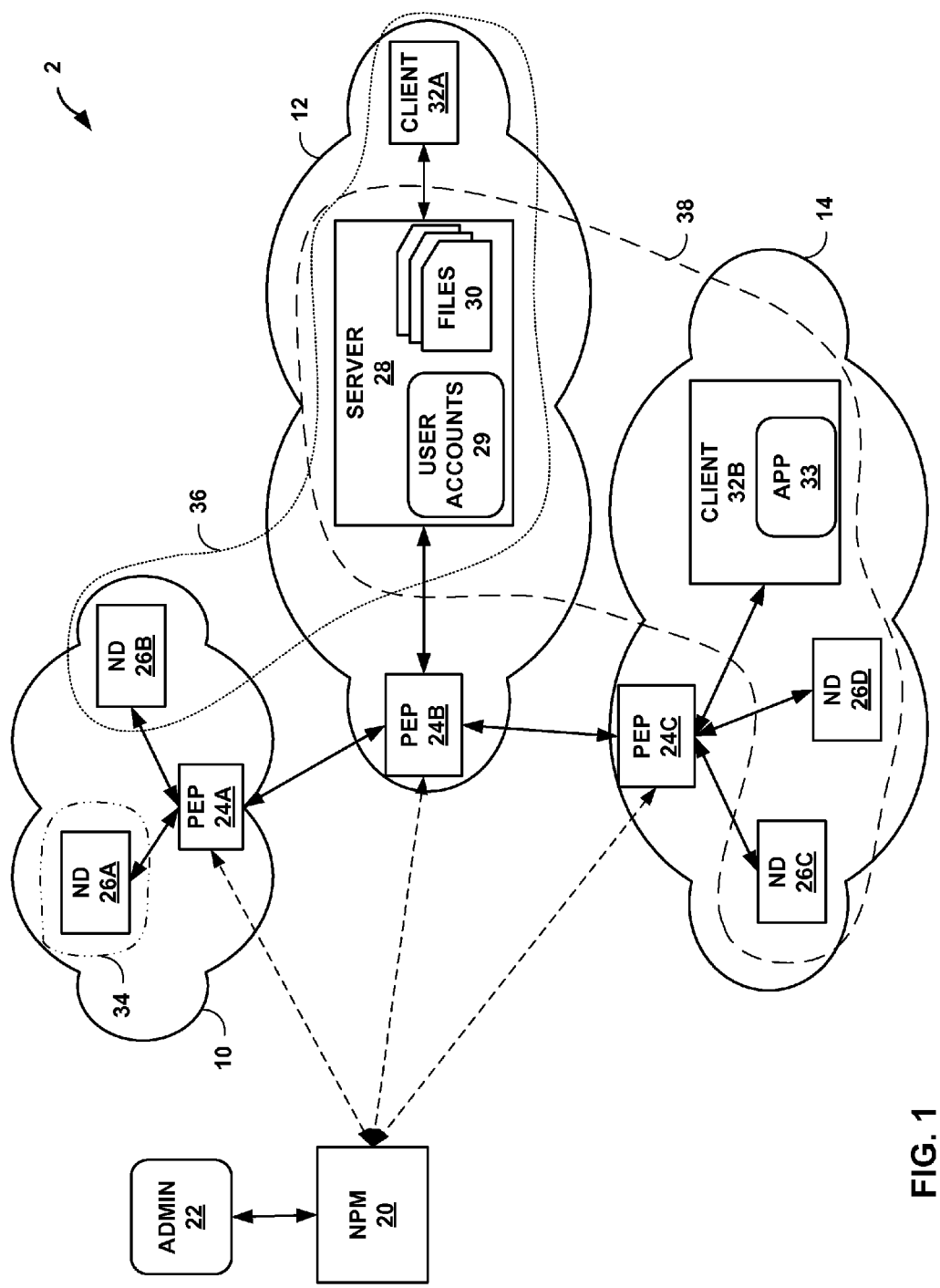
FIG. 1 is a block diagram illustrating an example computer network system having security domains and endpoint computing resources.

FIG. 1 is a block diagram illustrating an example enterprise network system 2 in which a network policy manager ("NPM") 20 manages the network policies as applied various network devices located within networks 10, 12, 14. Each of networks 10, 12, 14 may be located in a different geographic location or within different subnets of network system 2. Networks 10, 12, 14 include networking equipment or devices that facilitate the transfer of data within and between networks 10, 12, 14, such as routers, switches, gateways, and hubs. In general, Networks 10, 12, 14 enable transmission of content between networks and network devices using one or more packet-based protocols, such as an Internet Protocol/Transmission Control Protocol (IP/TCP). In this respect network 10 may support the transmission of data via discrete data units, often referred to as "packets." As a result, networks 10, 12, 14 may be referred to as "packet-based" or "packet switched" networks. While described in this disclosure as transmitting, conveying, or otherwise supporting packets, networks 10, 12, 14 may transmit data according to any other discrete data unit defined by any other protocol, such as a cell defined by the Asynchronous Transfer Mode (ATM) protocol, or a datagram defined by the User Datagram Protocol (UDP).

In one embodiment, networks 10, 12, 14 include policy enforcement points ("PEPs") 24A-24C (collectively, "policy enforcement points 24") that are configured by network policy manager 20 to enforce network policies. An administrator ("ADMIN") 22 configures network policies for network system 2 by interacting with network policy manager 20. Network policy manager 20 may be a computer or other network device located within one of networks 10, 12, 14 or anywhere else within network system 2 such that network policy manager 20 may exchange network data, such as configuration information, with one or more of policy enforcement points 24. Each policy enforcement point 24 may comprise one or more of a firewall, an intranet controller, a secure socket layer (SSL) virtual private network (VPN) gateway, a radius server, a subscriber resource device, a unified access control (UAC) device and/or any other type of networking equipment or device that may enforce network policies within networks 10, 12, 14.

In accordance with the techniques described herein, administrator 22 interacts with network policy manager to define a business policy graph for network 2 that is independent of its particular physical network topology, i.e., that the network is organized into geographically separate networks 10, 12, 14 protected by respective PEPs 24. For example, administrator 22 interacts with network policy manager 20 to define the business policy graph to include abstract security domains 34, 36 and 38, and configures network policies that are enforced against the abstract security domains without regard to physical subnets or PEPs 24. The techniques of this disclosure may enable administrator 22 to define the network policies without knowledge of the device-specific details of the configuration when deployed to PEPs 24. The network policies define, for example, the kind of traffic permitted or blocked between two different security domains or actions to be taken on the network traffic between security domains, such as if a user needs to be authenticated or if the traffic needs to be rate-limited, with out regard to which of PEPs 24 will be required to enforce the policies. In other examples, the policies may define which applications hosted by one or more servers within a domain may be accessed from outside a domain. In more examples, network policies may define which users may access a server, which applications a user may access, or which files or directories a user may access using, for example, a client device.

As illustrated in FIG. 1, networks 10, 12, 14 include various network devices including network devices ("ND") 26A-26D (collectively, "network devices 26"), server 28, and clients 32A and 32B (collectively, "clients 32"). Network devices 26 include network devices connected to networks 10, 12, 14 such as personal computers, laptop computers, mobile telephones, network telephones, personal digital assistants, or another type of endpoint computing device capable of interfacing with and communicating over networks 10, 12, 14. Server 28 may include email servers, domain controllers, web servers, print servers, printers, network copiers, or other network devices. In some examples, server 28 includes user accounts 29 and files 30. Server 28 may utilize user accounts 29 control access to the resources of server 28, such as files 30, by users. Clients may include a personal computer, a laptop computer, a network telephone, a television set-top box, a video game system, a point-of-sale device, an intermediate network device, a network appliance, or any other type of device capable of interfacing with and communicating over networks 10, 12, 14. Clients 32 may exchange network data with server 28, e.g., client 32A exchanging data with server 28 over a network link, execute software applications, e.g., application ("APP") 33 executing on client 32B, and perform other computing tasks for a user.

In accordance with the techniques of this disclosure, administrator 22 interacts with network policy manager 20 to group each of network devices 26, server 28, and clients 32 are into one or more security domains 34, 36, 38 so as to form a business policy graph that is independent of the physical topology of the network. Security domains 34, 36, 38 are logical groupings of devices or end-user computing resources within network system 2, e.g., a logical grouping of one or more of network devices 26, server 28, clients 32, user accounts 29, files 30, and application 33. As shown in the example of FIG. 1, security domain 34 includes network device 26A, security domain 36 includes network device 26B, a subset of computing resources of server 28 and client 32A, and security domain 38 includes network devices 26C and 26D, a different subset of computing resources of server 28, and client 32B. The computing resources of server 28 include user accounts 29 and files 30. Security domain 36, for example, may include one or more of user accounts 29 for controlling access by client 32A to one or more of files 30 while security domain 38 may include one or more different user accounts 29 for controlling access to server 28 by client 32B. Administrator 22 defines what kind of network traffic is permitted to flow through security domains and may configure other network policy options, such as firewall policies, for the traffic passing through each security domain.

Each security domain may by further defined to include security sub-domains. In one example, network system 2 represents one global security domain and security domains 34, 36, 38 each represent a security sub-domain within the global security domain. A security domain having one or more sub-domains may be referred to as a "parent" security domain for the sub-domains one level below the security domain. Administrator 22 may configure a global network policy to apply to the global security domain and then configure different network policies for each sub-domain. A parent security domain may be a sub-domain of another security domain. That is, any number of sub-domains may exist within the global security domain and any number of levels of sub-domains may exist. For example, security domain 36 may include N different sub-domains where each of the N different sub-domains may have N levels of sub-domains.

Each sub-domain includes a subset of the endpoint computing resources included in the parent security domain and each sub-domain further inherits the network policies of the parent security domain. Administrator 22 may elect to allow certain network policies of a parent security domain to be over-ridden by a sub-domain while enforcing other network policies of the parent security domain regardless of the network policy configuration of the sub-domain. Administrator 22 chooses which network policies must be enforced and which network policies may be over-ridden by a sub-domain on a policy-by-policy basis.

After the administrator configures the security domains and the network policies via network policy manager 20, network policy manager 20 determines which of policy enforcement points 24 need to be configured, generates device-specific configuration information for each policy enforcement point 24 that needs to be configured, and issues commands to the appropriate policy enforcement points 24 to configure each policy enforcement point 24.

In this manner, the techniques of this disclosure may enable an administrator to create a logical grouping of network devices and endpoint computing resources that abstracts the network topology to enable an administrator to configure network policies without understanding device-specific configuration requirements and without respect to the physical location of the various elements included in the security domains. By utilizing these techniques, the complexity of managing network security as well as the operational costs associated with managing the network may be reduced.

Figure 2:
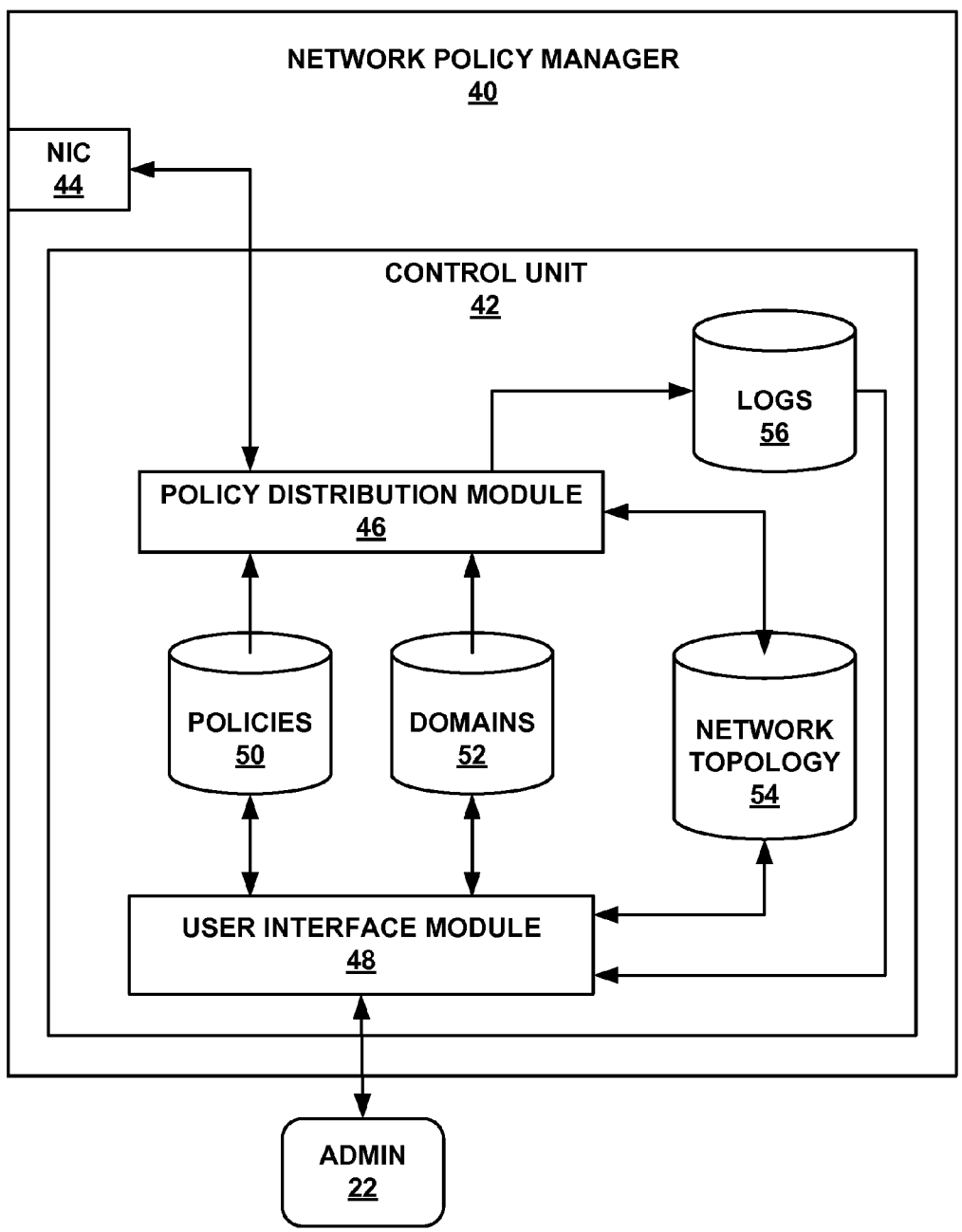
FIG. 2 is a block diagram illustrating and example network management device that may implement the techniques of this disclosure.

FIG. 2 is a block diagram illustrating and example network policy manager 40 that may implement the techniques of this disclosure. For purposes of illustration, network policy manager 40 may be described below within the context of the example network system 2 of FIG. 1 and may represent network policy manager 20. In this example embodiment, network policy manager 40 includes control unit 42 and network interface card ("NIC") 44. Network interface card 44 provides a physical interface for coupling network policy manager 40 to a network, e.g., network 10 of FIG. 1.

Control unit 42 provides an operating environment for executing policy distribution module 46 and user interface module 48 and for storing network policies 50, security domain information 52, network topology information 54, and logs 56. Control unit 42 may include one or more microprocessors (not shown in FIG. 2) that execute software instructions, such as those used to define a software or computer program, stored on a tangible computer-readable storage medium (not shown in FIG. 2). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 42 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Policies 50 stores network policies configured by administrator 22. Similarly, domains 52 stores security domain information configured by administrator 22. Network topology 54 includes network topology information, such as which network devices are located within which subnets or networks of an enterprise network system, e.g., network system 2 of FIG. 1. Network policy manager 40 may receive network topology information from administrator 22. Network policy manager 40 may also exchange messages with devices within the network system and automatically generate network topology information based on the messages. Policies 50, domains 52, network topology 54, and logs 56 may each be stored in the form of one or more tables, databases, linked lists, radix trees, or other suitable data structure.

Administrator 22 interacts with network policy manager 40 via user interface module 48. For example, administrator 22 may utilize user interface module 48 to both configure security domains and network policies for network system 2, illustrated in FIG. 1, and deploy the configured network policies to network system 2. Example user interfaces generated by user interface module 48 and presented to administrator 22 for performing the techniques of this disclosure are illustrated in FIGS. 3-11 and 13-15.

In one embodiment, network policies include network address information, security domain information, application information, and network protocol information. The network address information includes a network address and may also include a name or other identifier, a description, an expiration date, e.g., valid until Jun. 29, 2014, and user configurable tags. The network address may be in the form of an Internet Protocol ("IP") address, a host name, or a network prefix. A network prefix is a contiguous group high-order bits that are common among all hosts within a particular network that typically identifies a subnet. An example network prefix is "192.168.4.0". In this example, the network prefix identifies a subnet of network devices each having an IP address starting with 192.168.4, such as 192.168.4.26. Each set of network address information, e.g., a network address, a name, a description, an expiration date, and tags, may be referred to as a network address object and may be grouped together to form network address object groups.

The security domain information includes a name for the security domain, a description, one or more network address objects or groups, and other properties, such as whether intra-domain traffic is permitted between network devices at different physical locations. Security domains may further abstract the physical network configuration beyond address objects. For example, a security domain may be named "HR Domain" and include all network devices within a human resources department of a company. The HR domain may include an address object that includes network address information about a subset of network devices located in London, England, a different address object that includes network address information about a subset of network devices located in New York City, N.Y., USA, and an address group that includes network address information about all of the network devices located in Sydney, Australia. When creating and deploying security policies, administrator 22 need only select the HR Domain to select all network devices within the human resources department of the company.

The application information includes information about application layer network protocols and other network protocols, where the application layer refers to layer 7 of the Open System Interconnection model. Example application layer protocols include Hypertext Transport Protocol ("HTTP"), Dynamic Host Control Protocol ("DHCP"), and File Transfer Protocol ("FTP"). Examples of other network protocols include Transport Control Protocol ("TPC"), Remote Copy Protocol ("RCP"), Microsoft RCP ("MS-RCP"), and Internet Control Message Protocol ("ICMP"). Each network protocol may include additional details specific to the particular protocol, such as port numbers, to provide more precise control over the portion of network traffic within each protocol that is included within the application information. The grouping of the application information for one particular application, e.g., the network protocol, the application category, the application name, the application description, and the additional details about the network protocol itself, may be referred to as an application object. Multiple application objects may be logically combined into an application group.

In another embodiment, network policies may include network address information, security domain information, and network device resource information. The network device resource information corresponds to a particular network device identified in the network address information and may include user account information, file or directory information, and/or computer program applications, for example. In one example of this embodiment, administrator 22 configures a particular file directory stored within a computer server as a security domain by specifying the network address of the computer server in the network address information, specifying the particular file directory in the network device resource information, and then including the network address information corresponding to the computer server within a security domain.

After administrator 22 configures the security domains and network policies, administrator 22 or another user deploys the network policies to the security domains. As further illustrated in FIGS. 13-15, administrator 22 first selects which policy to deploy and then may review the particular policy enforcement points 24 that are included in deploying the network policy. For each of the required policy enforcement points 24, administrator 22 may elect to view only the pending configuration changes or the complete configuration. Administrator 22 may also preview the network paths that will be available between the security domains after the network policy is implemented. In some examples, administrator 22 overrides the automated system and chooses not to configure certain required policy enforcement points 24 because, for example, of a conflict with another, currently implemented, network policy. Administrator 22 may schedule the policy deployment to occur at a particular day and time.

In general, policy distribution module 46 deploys the network policies. In order to deploy the polices, policy distribution module 46 determines how to deploy the configured network policies to network system 2, generates device-specific configuration information based on the configured network policies, and issues commands to one or more of policy enforcement points 24 to configure the policy enforcement points 24 in accordance with the device-specific configuration information. In order to determine how to deploy the configured network policies to network system 2, policy distribution module 46 analyzes network policy information from network policies 50, security domain information from domains 52, and network topology information from network topology 54. That is, policy distribution module 46 uses the network address information within domains 52 and the network topology information to determine where in network system 2 the network devices included in the security domain are located and then determines which of policy enforcement points 24 are required to enforce the network policies against those network devices.

After determining which of policy enforcement points 24 are required to enforce the network policies, policy distribution module 46 generates the device-specific configuration information for each of the required policy enforcement points 24. In some examples, the device-specific configuration information includes only the configuration changes that need to be made to the required policy enforcement points 24. In other examples, the device-specific configuration information includes the complete set of configuration information, including the previously configured parameters not affected by deploying the network policy. Policy distribution module 46 may be configured to generate updated configuration information or complete configuration information on a device-by-device basis and may generate both types of configuration information within a single policy deployment. Policy distribution module 46 then issues messages to the required policy enforcement points 24 via NIC 44 to configure the required policy enforcement points 24, thereby deploying the network policy.

In some embodiments, server 28 may act as a policy enforcement point for computing resources, such as user accounts, files, and directories, within a security domain. Network topology information 54 may include detailed information about the resources available to each policy enforcement point, e.g., the files and directories managed by server 28. In this embodiment, policy distribution module 46 determines how to configure server 28 to enforce the network policies against the selected computing resources and generates configuration information for server 28. Policy distribution module 46 then deploys the network policy to server 28 by issuing commands to configure server 28 in accordance with the generated configuration information.

After policy distribution module 46 deploys the network policy to the required policy enforcement points 24, the policy distribution module 46 notifies administrator 22 of the status of the policy deployment by, for example, sending administrator 22 an email, displaying a visual or auditory alert via user interface module 48, sending a text message, or by any other means of notifying a person of the status of the policy deployment. Policy distribution module 36 also maintains a persistent record of policy deployment operations in logs 56. Logs 56 includes, for example, the details of the configuration changes included in the network policy deployment, a user identifier corresponding to an administrator who deployed the network policy, the date and time the network policy was deployed, and the result status of the deployment, e.g., success or failure. Administrator 22 may review the information stored in logs 56, via user interface module 48, at any time.

Each network policy for each domain and sub-domain includes its own, separately configured set of network address information and application information, protocol information, and computing resource information, as appropriate for each embodiment. That is, changes made by administrator 22 to the network policies inherited by the sub-domain are not propagated to the parent security domain. However, if so configured by administrator 22, changes made to the network policies of the parent security domain may propagate down to any sub-domains. Options for managing the propagation of changes to the network policies of the parent domain as well as options for managing which, if any, inherited network policies may be modified in the sub-domain are user configurable and may be enforced globally, across all domains, on or an domain-by-domain basis.

In some embodiments, if an endpoint computing resource moves to a different subnet or physical location, network policy manger 40 is configured to automatically update the network topology information and take one or more actions to update the affect network policy deployment. Using network system 2 of FIG. 1 as an example, if network device 26A is moved from network 10 to network 12, network policy manager 40 receives updated network topology information. Network policy manager 40 may actively scan the network system 2 to determine the current network topology or administrator 22 may configure network policy manager 40 with the network topology information.

Upon detecting a change in the network topology information, policy distribution module 46 determines if any of the policy enforcement points 24 need to be reconfigured based on the security domain information, the network policy information, and the network topology information. In some examples, a network device may move from one physical location or subnet to a different physical location or subnet without requiring any reconfiguration of the policy enforcement points. For example, in the example illustrated in FIG. 1, if network device 26C is moved from network 14 to network 12, policy enforcement points 24B and 24C may not require any configuration changes. However, in the example above where network device 26A moves from network 10 to network 12, network device 26A is configured within its own security domain 34. Therefore, policy distribution module 46 determines that the configuration information of policy enforcement points 24A and 24B needs to be updated.

In one embodiment, network policy manager 40 is configured to alert administrator 22 of the required configuration changes without taking any further action until administrator 22 configures network policy manager 40 to deploy the required configuration changes. In another embodiment, network policy manager 40 is configured to automatically update the policy enforcement points 24 upon detecting a change in network topology. In this embodiment, policy distribution module 46 updates the configuration of policy enforcement points 24A to remove the configuration information associated with the network policies configured with respect to security domain 34 and causes policy enforcement point 24B to be configured to enforce the network policies for security domain 34.

Administrator 22 may also configure sub-domains via user interface module 48. For example, administrator 22 selects a currently configured security domain, e.g., security domain 36 of FIG. 1, and indicates the intent to create a sub-domain based on the selected security domain. The selected currently configured security domain may be referred to as a parent security domain to the sub-domain. Administrator 22 selects a subset of the network devices or endpoint computing resources included in the parent security domain. The network policies configured for the parent security domain are automatically inherited by the sub-domain. Administrator 22 may elect to modify the inherited network policies by, for example, adding, removing, or changing the application information on which the inherited network policies are based.

When adding or removing an endpoint computing resource, network policy manager 40 detects the change to the network topology and alerts administrator 22. In some examples, administrator 22 confirms the addition or removal prior to network policy manager 40 performing any network policy deployment techniques. In other examples, when an endpoint computing resource is removed, network policy manager 40 is configured to automatically update network policy information, e.g., remove the device from the security domain or address objects, and automatically update the configuration information of the policy enforcement points, as needed. When adding an endpoint computing resource to network system, network policy manager 40 may be configured to perform any combination of alerting administrator 22 of the new endpoint computing resource, automatically adding the new endpoint computing resource to a default security domain, and applying the previously configured network policies to the new endpoint computing resource based when the network address of the new endpoint computing resource falls within an already configured security domain.

FIGS. 3-11 are screen illustrations of various user interfaces for managing security domains and security policies. For purposes of illustration, each example user interface may be described below within the context of the example network system 2 of FIG. 1 and network policy manager 40 of FIG. 2 and may be generated by user interface module 48 of network policy manager 40.

Figure 3:
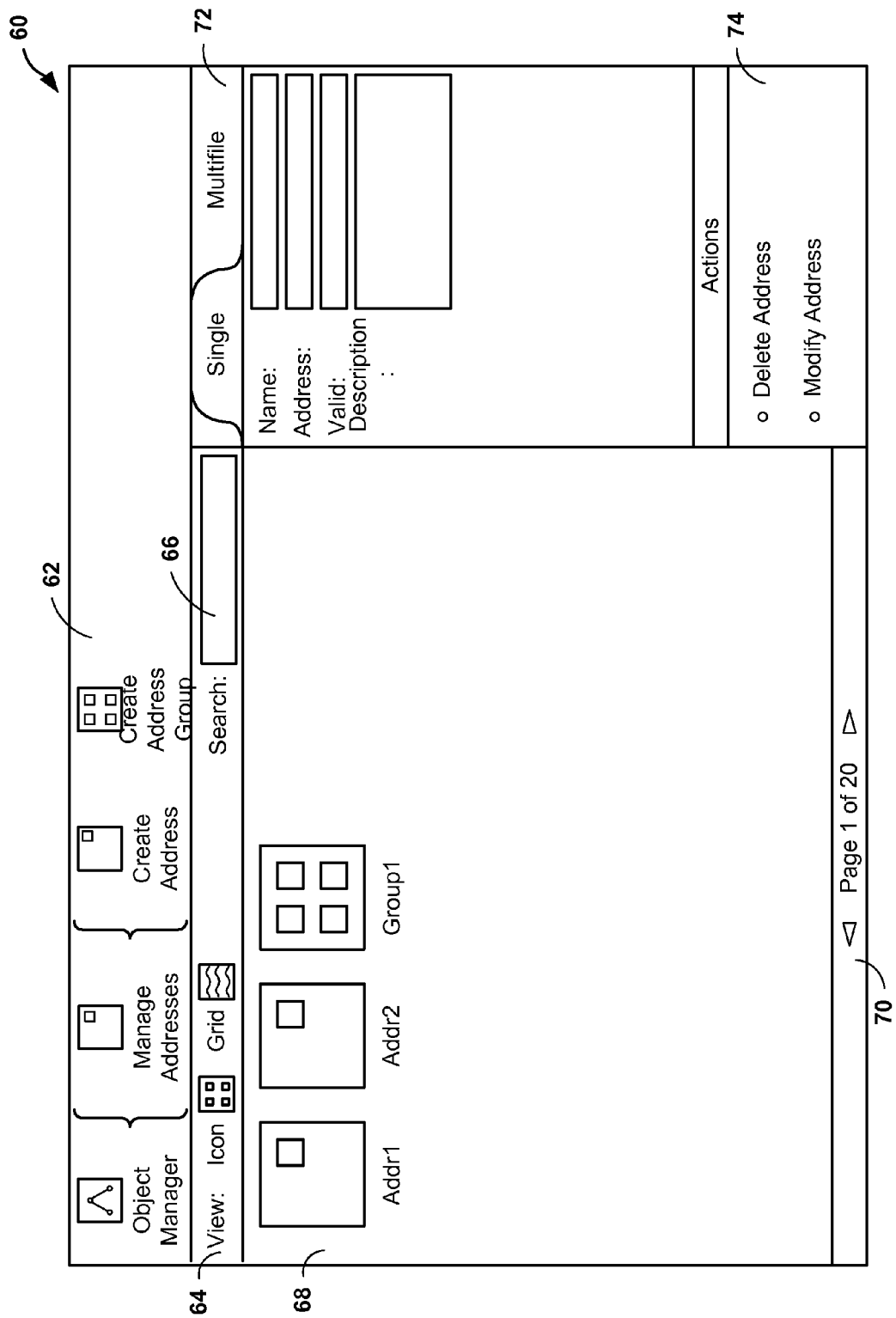

FIG. 3 illustrates an example user interface 60 that is presented to administrator 22 upon selecting the "manage addresses" option within task bar 62. User interface 60 displays currently configured address objects and address object groups in an icon-based format within display area 68. Administrator may switch between icon view and grid view by selecting the corresponding option within view options 64. Grid view is illustrated in FIG. 4 and will be described with respect to FIG. 4.

Upon administrator 22 selecting an address object or group, user interface 60 populates the corresponding information within the address object display area 72. As shown in FIG. 3, address object display area 72 displays address object information for a single address object. However, if administrator 22 selects an address object group, such as Group 1, address object display area 72 automatically updates to display the multifile template and populates it with information from the selected address object group. Administrator 22 may select an address object or group and then choose to delete or modify the address object or group by selecting one of the actions within the action area 74.

When more address objects and groups are configured than may be visible within address object display area 68, pagination 70 enables administrator 22 to move between multiple pages and displays the current page information as well as the total number of pages. Administrator may also filter the address objects and groups or search within the set of address objects and groups by entering text into search field 66. Search field 66 may enable administrator 22 to quickly find a particular address object or group without having to examine multiple pages of address object and groups.

In general, to select an element within user interface 60 or any subsequent user interface examples illustrated in this disclosure, administrator 22 may use a computer mouse, touch gestures, keyboard commands, a graphics tablet or any other type of input device capable of interacting with network policy manager 40.

FIG. 4 illustrates an alternative example user interface 80 that is presented to administrator 22 upon selecting the "manage addresses" option. User interface 80 displays currently configured address objects and address object groups in a grid, e.g., tabular, format and may provide additional information, such as a listing of all of the address objects included in a group, the type of address object, and the configured network address, to administrator 22. The additional information enables administrator 22 to take other actions not available within the example user interface illustrated by user interface 60 of FIG. 3. For example, administrator 22 may remove an address object from an address object group by selecting the address object and then selecting the "remove from group" action.

FIG. 5 illustrates an example user interface 90 for creating or modifying an address object. Administrator 22 may reach this address object creation interface by selecting the create address option within task bar 62 of user interface 60 of FIG. 3 or by selecting an existing address object within address object display area 68 and then selecting modify address from action area 74. When creating a new address object or modifying an existing address object, administrator 22 may enter a name, description, an expiration date, and various user-defined tags. Administrator 22 also selects the type of network address included in the address object from address type 92 and enters a network address corresponding to the selected network address type in network address 94. The label for network address 94 (illustrated as "IP Address" in the example of FIG. 5) is dynamically updated to reflect the selected address type. For example, if administrator 22 selects "Host Name" for address type 92, the label for network address 94 is dynamically updated to "Host Name."

Figure 6:
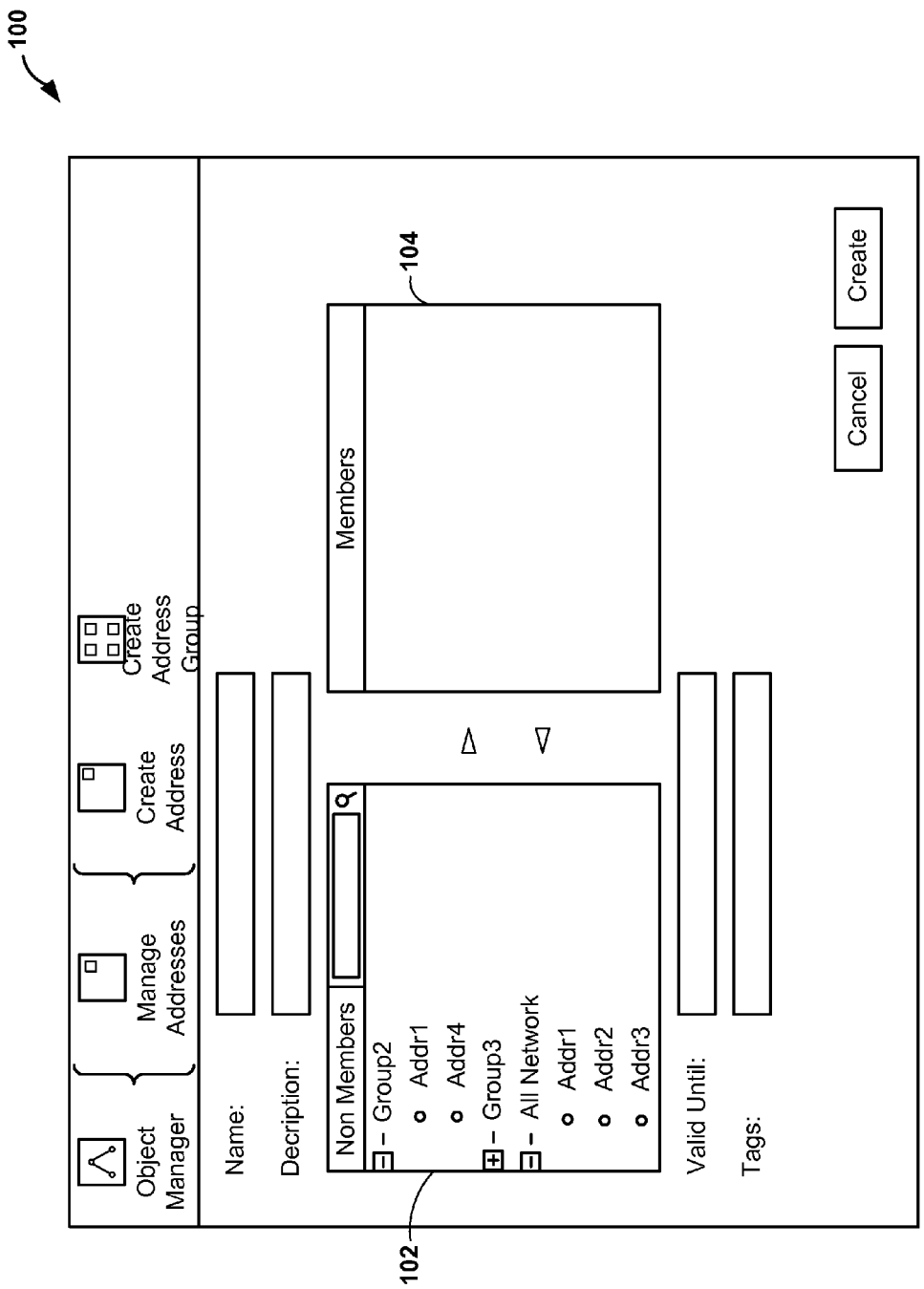

FIG. 6 illustrates an example user interface 100 for creating or modifying an address object group. Administrator 22 may reach this address object creation interface by selecting the create address group option within task bar 62 of user interface 60 of FIG. 3 or by selecting an existing address object group within address object display area 68 and then selecting modify address from action area 74. When creating or modifying address object groups, administrator 22 enters a group name, description, expiration date, user-defined tags, and selects address objects and address objects groups to add or remove from the address object group being configured. That address objects and groups not included in the address object group being configured are listed within non members 102. Administrator 22 can search or filter the address objects and group listed within non members 102 using the search box. Address objects and groups that are included in the address object group being configured are listed in members 104. After administrator 22 completes configuration for the address group, administrator 22 selects the create button. When administrator 22 is modifying an existing address object group, the create button is replaced with a modified button. If administrator 22 no longer wants to make changes to the address object group, administrator 22 selects the cancel button.

Figure 7:
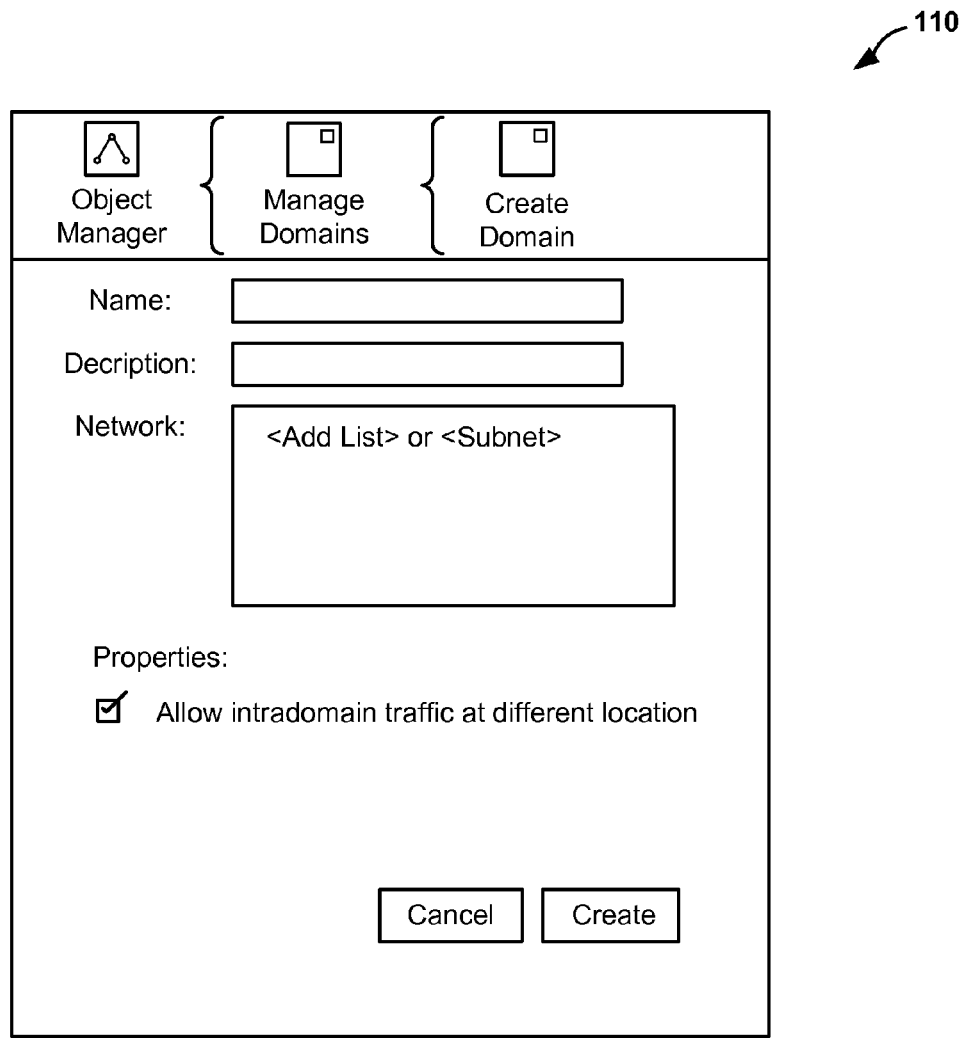

FIG. 7 is an example user interface 110 for creating or modifying a security domain. Administrator 22 selects a security domain object to modify from a user interface substantially similar to user interface 60 of FIG. 3, which may be referred to as a manage domains user interface. The manage domains user interface is presented when administrator 22 selects a "manage domains" option within the task bar, e.g., task bar 62 of FIG. 3. In the manage domains user interface, security domain objects are displayed in an icon or grid view and administrator 22 may select a security domain to modify or delete or select a create domain option to create a new security domain. When administrator 22 selected create domain, the example user interface 110 is presented. Administrator 22 may enter a domain name, a domain description, select previously configured network address objects or groups, and configure other properties for the security domain, such as whether or not to allow intradomain network traffic between devices within the same security domain, but located at different physical locations. When administrator 22 selects a domain to modify, the fields illustrated in user interface 110 are pre-populated with the existing configuration information for the selected security domain and the create button is replaced with a modify button. After administrator 22 makes the desired changes or configures a new domain, administrator 22 selects the modify or create button and the changes are saved to domains 52 of network policy manager 40 of FIG. 2.

Figure 8:
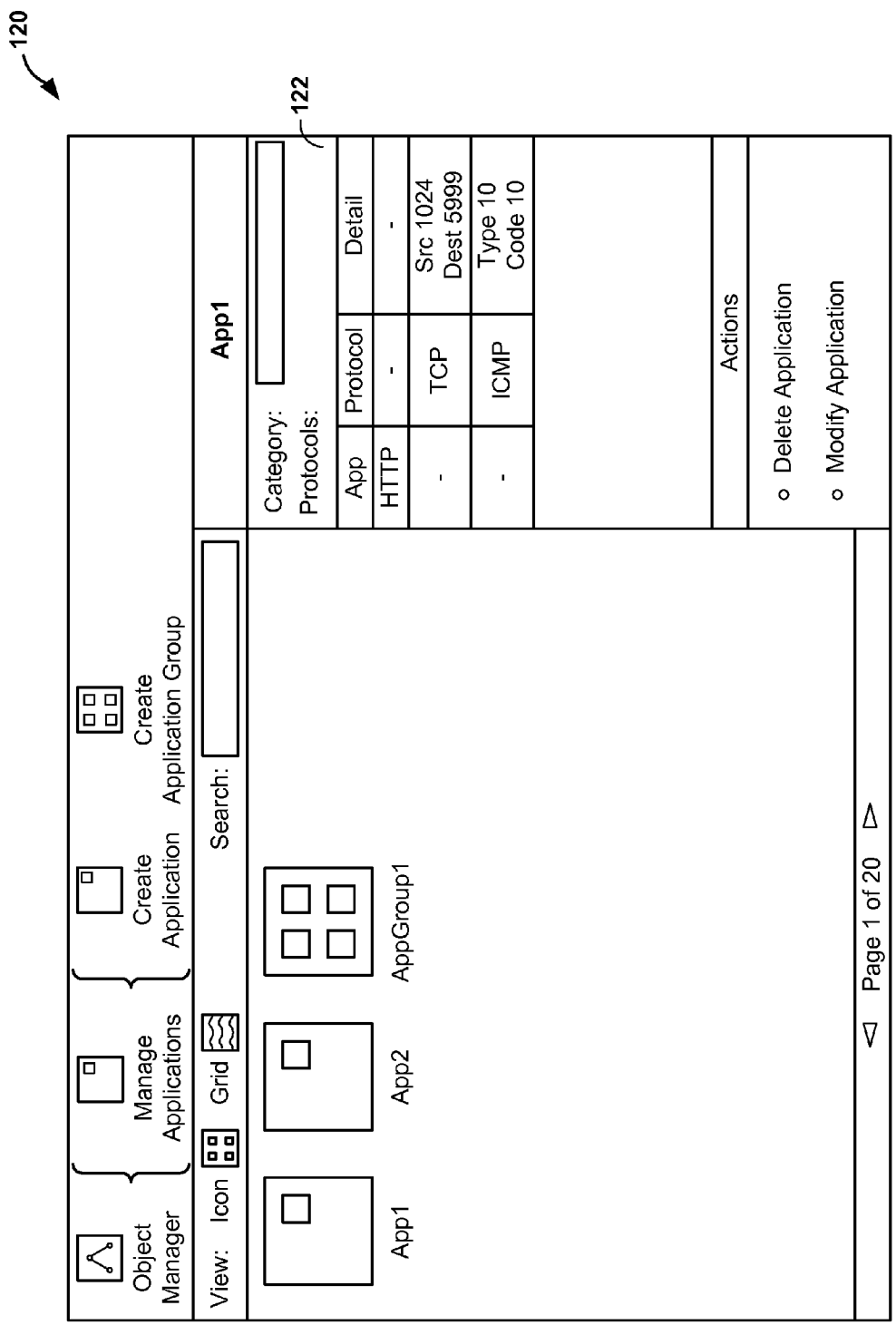

FIG. 8 is an example user interface 120 for viewing and selecting application objects and application object groups. Similar to user interface 60, the application objects and groups may be displayed in an icon view or a grid view and may be searched or filtered using a search box. Upon administrator 22 selecting an application object, application detail display 122 automatically loads the category and protocol information associated with the selected application object and displays the details to administrator 22. Application detail display 122 may also include additional information about the selected application object, such as the name and description associated with the selected application object. In the example of FIG. 8, application detail display 122 does not enable administrator 22 to modify the selected application object. Rather, administrator 22 selects the modify application action to modify the selected application object or group.

Figure 9:
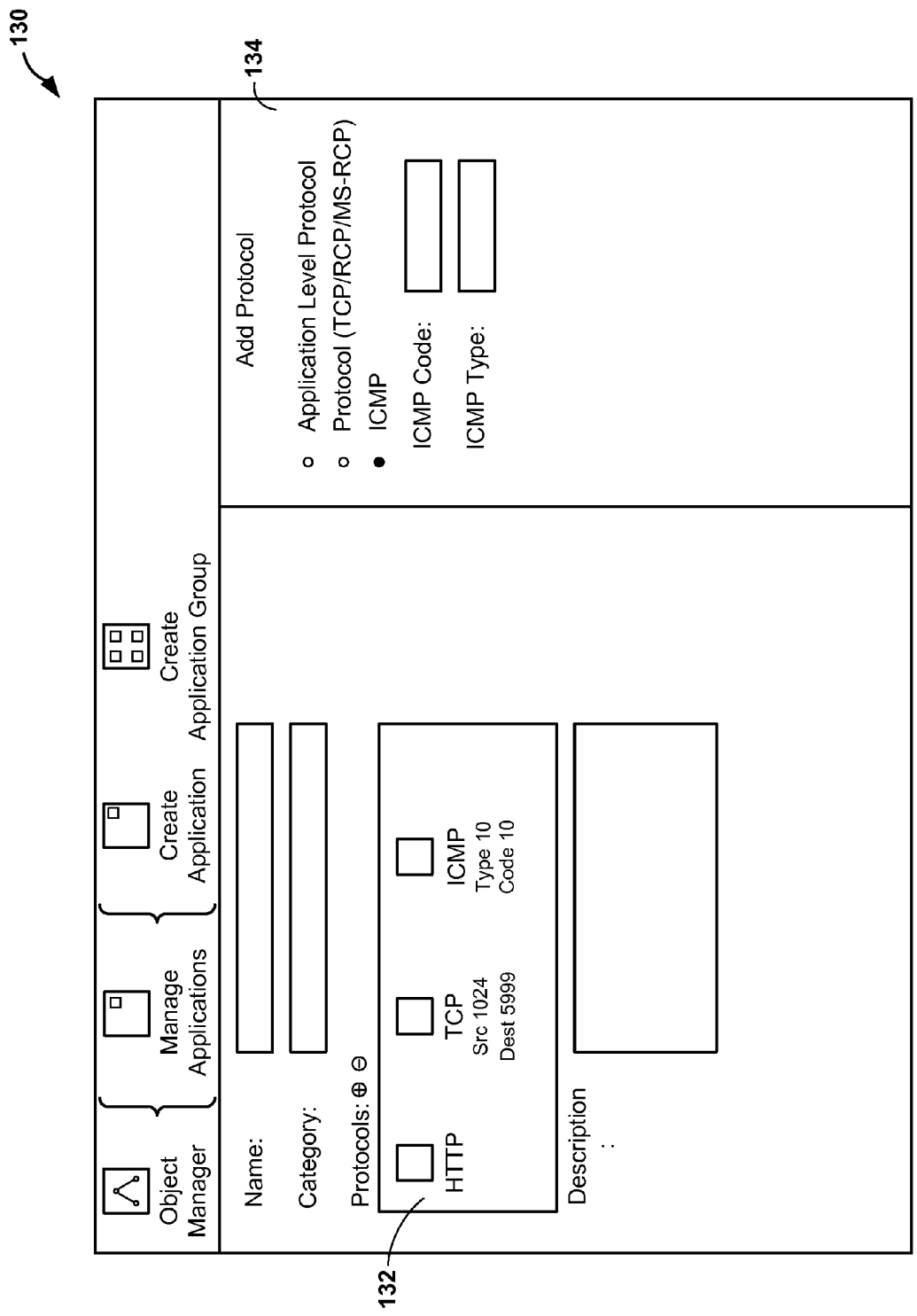

FIG. 9 is an example user interface 130 for creating or modifying an application object. After administrator selects an application object and selects the modify application action via user interface 120 of FIG. 8, for example, administrator 22 is presented with user interface 130. When administrator 22 is presented with user interface 130 after selecting an application object and then selecting the modify action, the name, category, protocols, and description fields are dynamically populated with the information corresponding to the selected application object. Administrator 22 may add or remove protocols associated with application object by selecting the plus and minus elements, respectively.

Administrator 22 may also be presented with user interface 130 upon selecting the create application task from the task bar. Administrator 22 enters the name of the application object, category, a description, and one or more network protocols. The network protocols are entered using the add protocol element 134. Administrator 22 selects one of application level protocol, protocol, and ICMP, for example. Add protocol element 134 dynamically updates based upon which option administrator 22 selects. As shown, administrator 22 selected ICMP, causing the ICMP code and ICMP type fields to be displayed by add protocol element 134. If administrator 22 selects protocol (TCP/RCP/MS-RCP), for example, add protocol element 134 updates to display fields such as a source port field, a destination port field, an inactivity timeout field, an RPC program number field, and a universally unique identifier (UUID) field, as required. Administrator 22 may add as many different protocols to the application object as desired. After each protocol is added, the protocol is displayed in the current protocol display area 132.

Figure 10:
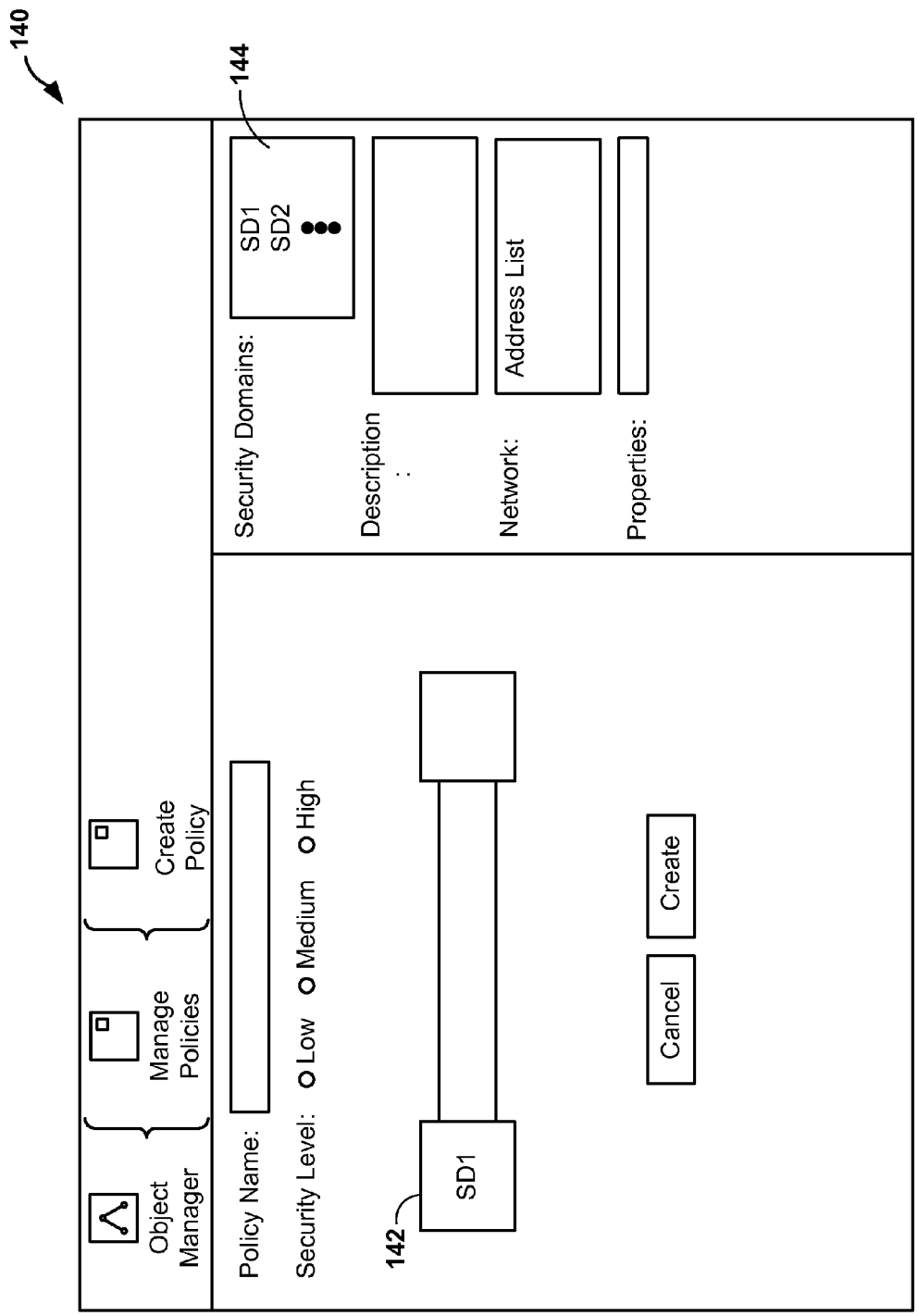

FIG. 10 is an example user interface 140 for creating a network policy. Administrator 22 selects an endpoint, such as endpoint 142, and then selects a security domain from the security domain list 144. Upon selecting a security domain from the security domain list 144, the description, network, and properties elements are dynamically updated with the appropriate information for the selected security domain. To associate the selected security domain with an endpoint, administrator may, for example, drag and drop the selected security domain onto the desired endpoint. In another example, administrator selects the desired endpoint and then double clicks or, in the case of touch-based input, double taps the desired security domain. Administrator 22 also assigns a name to the network policy and may select a default security level, e.g., low, medium, or high. In some examples, the default security level pre-populates the application objects associated with the network policy with a set of default application objects corresponding to the selected level of security.

As illustrated in FIG. 10, administrator 22 selects two security domains and creates a network policy to manage the network traffic between the security domains. For example where a security domain includes files or directories stored on a server and where a second security domain includes user accounts, administrator 22 may select these security domains to configure network access between the user accounts and the files or directories. For example, administrator configures the network policy to require that any user accounts within the security domain require authentication prior to accessing the file or directories within the other security domain. In other examples, administrator 22 may select a single security domain and create a network policy that manages the network data being sent and received by the computer resources included in the security domain. Examples of how the network policy manages network data include restricting the permitted network data being sent or received or by requiring authentication or encryption prior to permitting network data from being sent or received.

Figure 11:
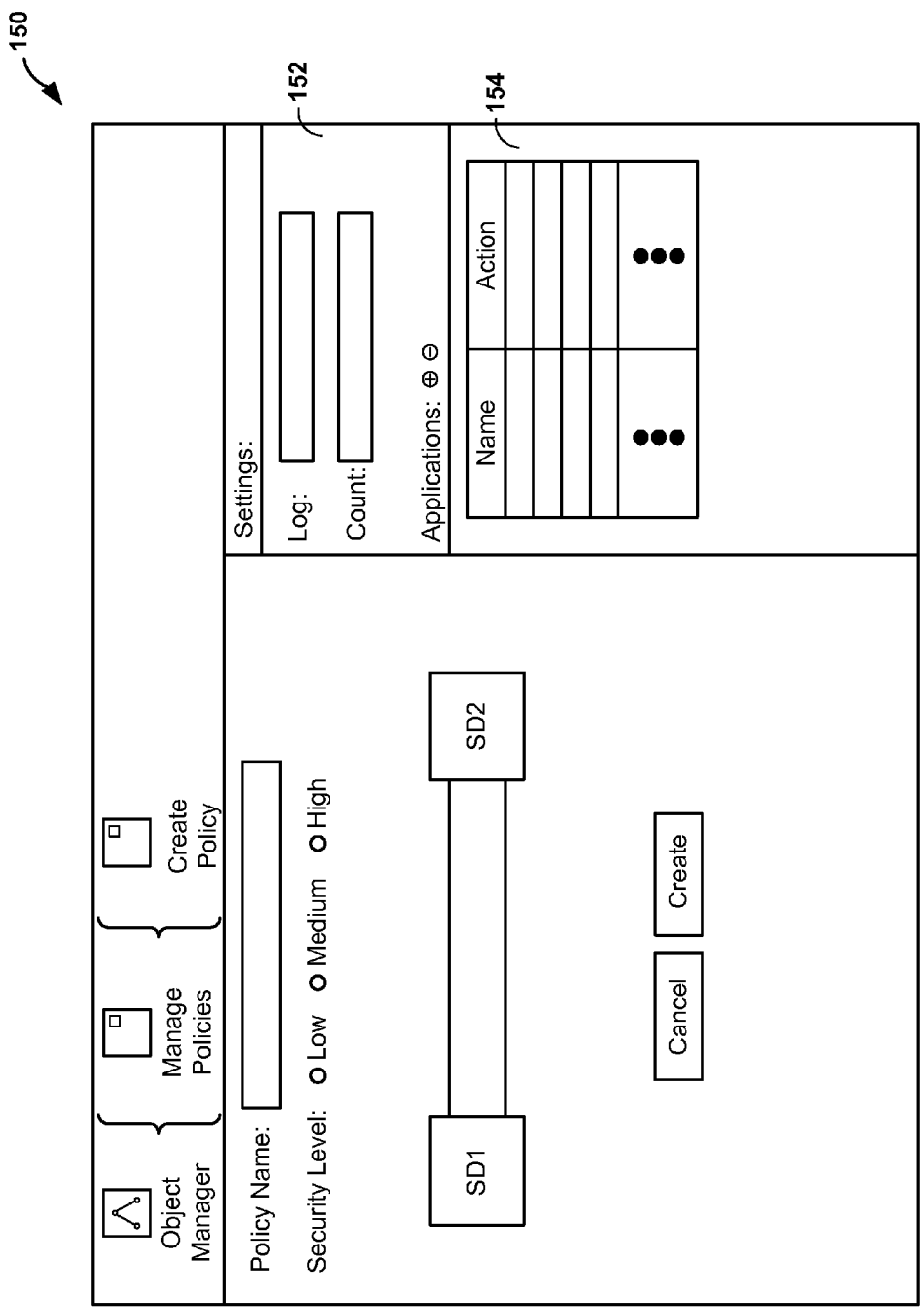

FIG. 11 is an example user interface 150 for configuring general settings and application objects of a network policy being created or modified by administrator 22. In one example, administrator 22 selects a set of actions to be taken when network data being processed by a policy enforcement point meets one of the criteria defined by the application objects or groups included in the network policy. The set of actions may be referred to as an action profile. In the example action profile 152, administrator selects and configures log count and log alert settings. Administrator 22 adds application objects and groups via applications interface 154. For example, by selecting the plus button, administrator 22 is presented with an application object and group selection interface (not shown) and selects the applicant object or group to add to the network policy. Administrator 22 also configures whether to allow or deny the network data affected by the application object, e.g., allow or deny http network data when the application object includes an http application layer protocol. Upon completing the configuration of the network address objects, application objects, security domains, and network policies, administrator 22 may then deploy the network policies to the network, e.g., network system 2 of FIG. 1.

Figure 12:
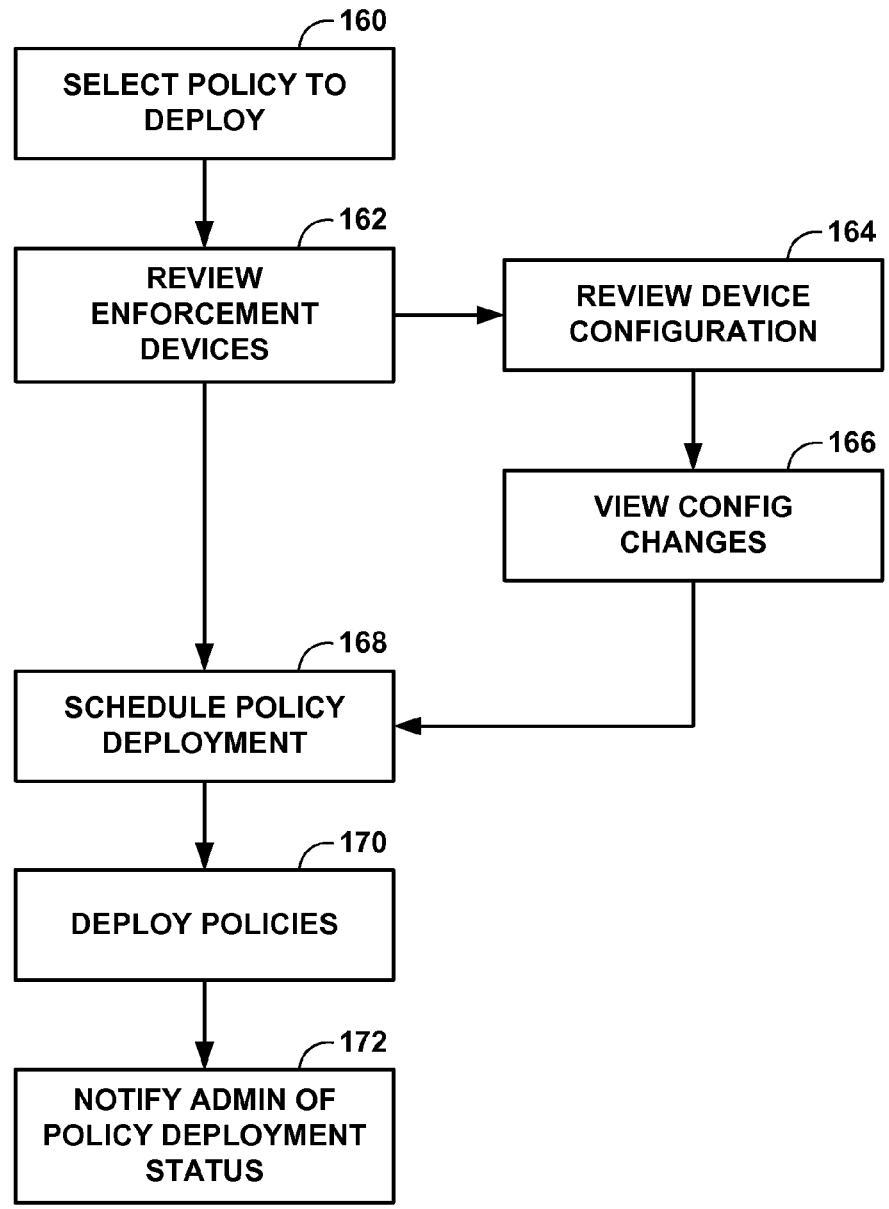
FIG. 12 is a flow chart illustrating an example method for deploying security policies across security domains.
Figure 13:
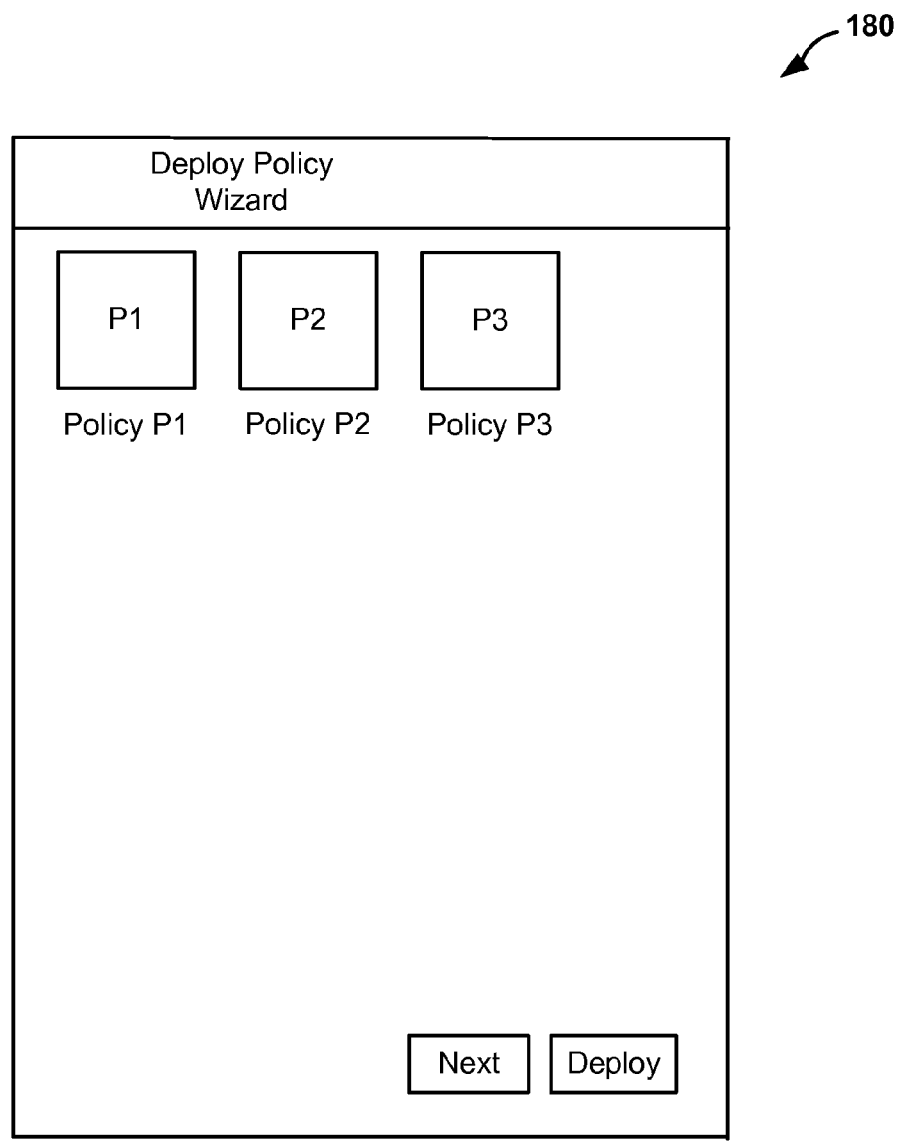
Figure 15:
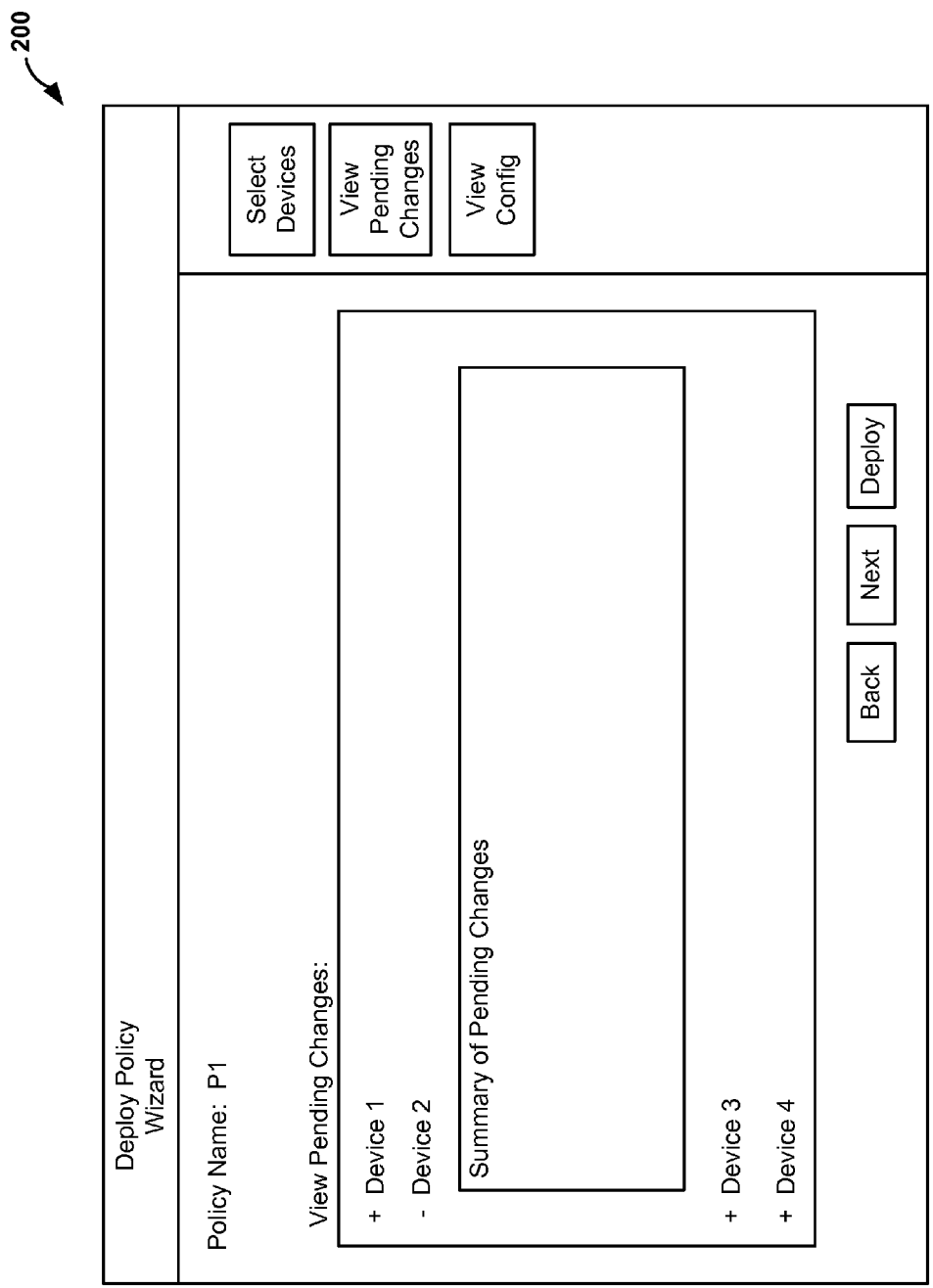

FIG. 12 is a flow chart illustrating an example method for deploying network policies in a manner consistent with the techniques described in this disclosure. For purposes of clarity, the method shown in FIG. 12 will be described with respect to the network system 2 of FIG. 1 and the network policy manager 40 of FIG. 2. User interface module 48 of FIG. 2 generates user interfaces to guide administrator 22 through the policy deployment workflow. Example user interfaces generated by user interface module 48 of network policy manager 40 that may be used by administrator 22 to deploy network policies are illustrated in FIGS. 13-15. Administrator 22 selects a pre-configured network policy to deploy (160). The network policies may include both network policies configured by administrator 22 or another administrator as well as default network policies configured by a device manufacturer, for example.

After selecting a network policy to deploy, administrator 22 reviews the policy enforcement points 24 that will be modified upon network policy deployment (162). Policy distribution module 46 automatically determines which policy enforcement points are required to deploy the selected network policies based on the security domains included in the network policies and network topology information 54.

Administrator may refine the policy enforcement points on which the network policies will be deployed by, for example, deselecting one or more policy enforcement points, thereby excluding them from receiving the updated configuration information corresponding to the network policy being deployed.

Administrator 22 may also choose to review the pending complete device configuration for each policy enforcement point (164). The pending complete device configuration includes the complete configuration for each policy enforcement point, including the pending changes required to deploy the selected network policy and any other device configuration parameters for each policy enforcement point. Administrator 22 is also given the option to view just the proposed configuration changes for each policy enforcement point (166).

Administrator 22 then schedules the network policy deployment (168) by, for example, selecting a day or time for policy distribution module 46 to deploy the network policy. Administrator 22 may elect to distribute the network policy at some future date and time or administrator may elect to immediately deploy the network policy. In either instance, policy distribution module 46 deploys the network policy (170) by, for example, generating the device-specific configuration information for each policy enforcement point that requires an updated configuration to deploy the network police and then issuing commands to configure each policy enforcement point in accordance with the generated configuration information. After completing the network policy deployment (170), network policy manager 40 determines the status of the deployment and notifies administrator of the success or any failures that occurred in deploying the network policy (172). Network policy manager may notify administrator in a variety of manners including, for example, a visual and/or auditory alert, an email message, a text message, or an automated telephone call.

FIGS. 13-15 are screen illustrations of various user interfaces for deploying security policies. For purposes of illustration, each example user interface may be described below within the context of the example network system 2 of FIG. 1 and network policy manager 40 of FIG. 2 and may be generated by user interface module 48 of network policy manager 40.

FIG. 13 is an example user interface 180 generated by user interface module 48 and presented to administrator 22 to facilitate the selection of a network policy to deploy. Administrator 22 selects a policy and then may either immediately deploy the selected policy, without first reviewing the policy, by selecting the deploy button or administrator 22 may review the policy and any corresponding configuration changes prior to deploying the policy by selecting the next button.

FIG. 14 is an example user interface 190 for reviewing the policy enforcement device that will be affected by deploying the selected network policy. The device list is automatically populated by policy distribution module 46. Policy distribution module 46 determines which policy enforcement devices to include in the list of affected devices by analyzing the network topology information of network topology 54 and the security domain information for each security domain included in the selected network policy. In some embodiments, policy distribution module 46 also examines the proximity to the endpoint computing resources included in the security domain, the policy enforcement point platform, e.g., the type of hardware and software installed on each policy enforcement point, and the software licenses installed on each policy enforcement point. Administrator 22 may remove a policy enforcement point from being included in the policy deployment by, for example, un-checking the box next to the policy enforcement point's name in the device list. Administrator 22 may also choose to distribute the network policy rules across one or more devices. In the example illustrated in user interface 190, administrator 22 deselected Device 3 and expanded the display for Device 2 to show how Device to will be configured after the selected network policy is deployed.

FIG. 15 is an example user interface 200 for viewing the pending changes, e.g., the differences in configuration for each device between the previous device configuration and the device configuration required to deploy the selected network policy. Administrator 22 may collapse or expand the pending configuration information for each device by selecting the +/−button next to each device name or by selecting the device name itself. If administrator 22 decides to deploy the selected network policy, administrator selects the deploy button and then selects the deployment date and time (not show). Policy distribution module 46 then deploys the selected network policy at the selected date and time by configuring each of the selected policy enforcement devices based on the selected network policy.

Figure 16:
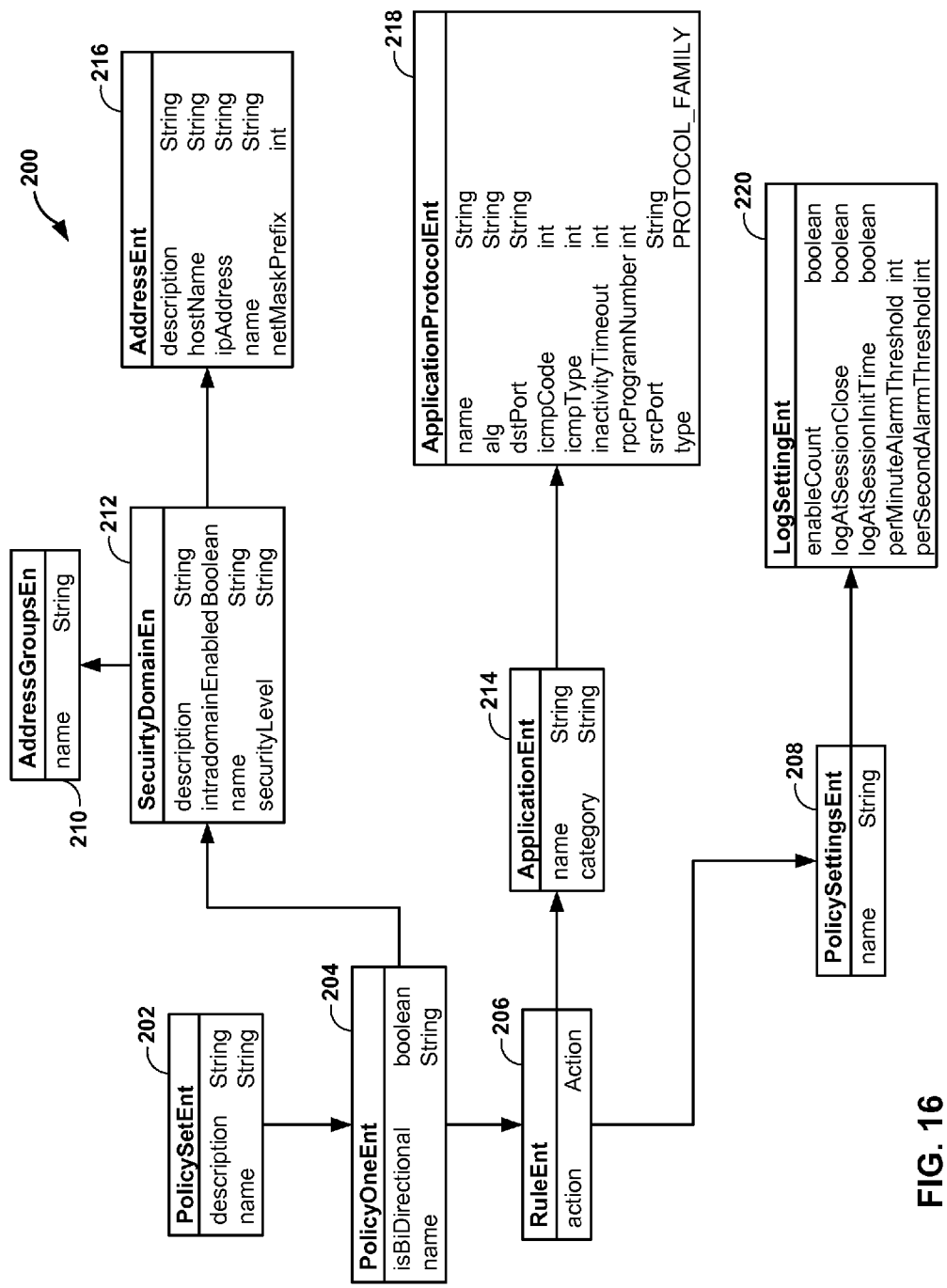
FIG. 16 is a conceptual diagram illustrating relationships between tables in a database that may be used to store security policy and security domain information.

FIG. 16 is a conceptual diagram illustrating relationships between tables in a database system 200 that may be used to store network policy and security domain information. Each element represents a table in database system 200 and each arrow indicates an relationship between the tables. For example, the PolicySetEnt table 202 includes a description and name field for each policy and is related to the PolicyOneEnt table 204. The PolicyOneEnt table 204 stores an indication as to whether the network policy applies to both sent and received network data using a Boolean field, e.g., is BiDirectional. The PolicyOneEnt table 204 is related to both the Rule Ent table 206 and the SecurityDomainEn table 212. RuleEnt table 206 links the network policy with application objects, e.g., ApplicationEnt table 214 and Application ProtocolEnt table 218, and with the user configured settings for the network policy, e.g., PolicySettingsEnt table 208 and LogSettingsEnt 220. While illustrated with only a log settings table, a variety of different policy settings may be configured for each network policy, such as administrator alert settings. SecuirtyDomainEn table 212 links the network address objects stored in AddressEnt table 216 and the network address group information stored in AddressGroupEn table 210 with the network policy.

Although illustrated for purposes of example as a relational database, database system 200 may store data in a variety of forms including data storage files, one or more database management systems (DBMS) executing on one or more servers, or combinations thereof. The database management systems may be a relational (RDBMS), hierarchical (HDBMS), multidimensional (MDBMS), object oriented (ODBMS or OODBMS) or object relational (ORDBMS) database management systems. database system 200 may store data, for example, within a single relational database such as SQL Server™ from Microsoft Corporation.

In this manner, the techniques of this disclosure may enable an administrator to create a logical grouping of network devices and endpoint computing resources that abstracts the network topology to enable an administrator to configure network policies without understanding device-specific configuration requirements and without respect to the physical location of the various elements included in the security domains. By utilizing these techniques, the complexity of managing network security as well as the operational costs associated with managing the network may be reduced.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
receiving, with a network management system, business policy graph information that defines a business policy graph of a network, wherein the business policy graph comprises a first set of endpoint computing resources configured as a first security domain and a second set of endpoint computing resources configured as a second security domain without an indication of any policy enforcement points within the network, wherein the business policy graph is independent of a physical topology of the network, wherein the first set of endpoint computing resources includes endpoint computing resources physically located at two or more different geographic locations, wherein the second set of endpoint computing resource includes at least one endpoint computing resource physically located at one of the two or more different geographic locations at which the first set of endpoint computing resources is located, wherein each of the two or more different geographic locations is associated with at least one respective policy enforcement point of a set of policy enforcement points, and wherein each endpoint computing resource of the first set and the second set of endpoint computing resources is accessible to a user to perform a computing task;
receiving, with the network management system, an indication of a set of network policies to apply to the first security domain and the second security domain, wherein a first portion of the network polices applied to the first security domain is different from a second portion of the network policies applied to the second security domain;
automatically determining, with the network management system, one or more policy enforcement points of the set of policy enforcement points, the one or more policy enforcement points being required to enforce the network polices against the first set of endpoint computing resources of the first security domain and the second set of endpoint computing resources of the second security domain, wherein automatically determining the one or more policy enforcement points comprises automatically determining the one or more policy enforcement points based on physical network topology information readable by the network management system, and wherein the physical network topology information includes information about the location of the first and second sets of endpoint computing resources and the set of policy enforcement points within the network; and
applying, with the network management system, the network policies to the one or more policy enforcement points of the set of policy enforcement points in order to enforce the network policies against the first set of endpoint computing resources of the first security domain and the second set of endpoint computing resources of the second security domain.

2. The method of claim 1, wherein the set of endpoint computing resources of the business policy graph includes endpoint computing resources located in two or more different subnets of the network.

3. The method of claim 1, further comprising generating, with the network management system, device-specific configuration information for each policy enforcement point of the one or more policy enforcement points based on the set of network policies, wherein applying the network policies to the one or more policy enforcement points comprises configuring, with the network management system, each of the one or more policy enforcement points with the network management system in accordance with the generated device-specific configuration information.

4. The method of claim 1, further comprising:
receiving, with the network management system, an indication of a subset of the first set of endpoint computing resources as a security sub-domain;
receiving, with the network management system, an indication of a different set of network policies to apply to the security sub-domain;
selecting, with the network management system and based on the subset of endpoint computing resources, a second subset of the one or more policy enforcement points required to enforce the different set of network policies against the subset of endpoint computing resources of the security sub-domain; and
applying, with the network management system, the different set of network policies to the second subset of policy enforcement points in order to enforce the different set of network policies against the subset of endpoint computing resources of the security sub-domain.

5. The method of claim 4, further comprising:
determining whether one or more network policies of the different set of network policies conflicts with one or more network policies of the set of network policies; and
in response to determining that one or more network policies of the different set of network policies conflicts with one or more network policies of the set of network policies, preventing the conflicting network policies from being applied to the second subset of policy enforcement points.

6. The method of claim 1, further comprising:
receiving, with the network management system, updated physical network topology information;
determining, with the network management system, one or more endpoint computing resources of the first security domain that moved to a different location within the network based on the updated physical network topology information;
automatically determining, with the network management system, a different set of policy enforcement points required to enforce the network policies against the first set of endpoint computing resources of the security domain based on the updated physical network topology information; and
applying, with the network management system, the network policies to the different set of policy enforcement points in order to enforce the network policies against the first set of endpoint computing resources of the first security domain.

7. The method of claim 6, wherein applying the network policies to the different set of policy enforcement points comprises determining that no configuration changes need to be made to the different set of policy enforcement points.

8. The method of claim 1, wherein the network policies regulate network traffic between the first security domain and the second security domain.

9. The method of claim 1, wherein the first set of endpoint computing resources includes one or more of a computer user account, a computer file, a computer file directory, a computer application, a computer, a printer, and a scanner.

10. The method of claim 1, wherein the set of policy enforcement points includes one or more of a firewall, an intranet controller, a secure socket layer (SSL) virtual private network (VPN) gateway, a radius server, a subscriber resource device, and a unified access control (UAC) device.

11. A network system comprising:
a plurality of endpoint computing resources, wherein each of the plurality of endpoint computing resources is accessible to a user to perform a computing task;
a business policy graph of a network, the business policy graph comprising a first set of the plurality of endpoint computing resources configured as a first security domain and a second set of the plurality of endpoint computing resources configured as a second security domain without an indication of any policy enforcement points within the network, wherein the business policy graph is independent from a physical topology of the network, wherein the first set of endpoint computing resources includes computing resources physically located at two or more different geographic locations, wherein the second set of endpoint computing resource includes at least one computing device physically located at one of the two or more different geographic locations at which the set of endpoint computing resources is located;
a set of policy enforcement points configured to enforce network policies, wherein each of the two or more different geographic locations is associated with at least one respective policy enforcement point of a set of policy enforcement points; and
a network management device comprising at least one processor that receives an indication of a set of network policies to apply to the first security domain and the second security domain, wherein a first portion of the network polices applied to the first security domain is different from a second portion of the network policies applied to the second security domain, automatically determines a subset of policy enforcement points of the set of policy enforcement points, the subset of policy enforcement points being required to enforce the set of network policies based on physical network topology information readable by the network management module, wherein the physical network topology information includes information about the location of the plurality of endpoint computing resources and the set of policy enforcement points within the network, and applies the network policies to the subset of policy enforcement points in order to enforce the network policies against the first set of endpoint computing resources of the first security domain and the second set of endpoint computing resources of the second security domain.

12. The network system of claim 11, wherein the plurality of endpoint computing resources includes computing resources located in two or more different subnets of the network.

13. The network system of claim 11, wherein the at least one processor of the network management device automatically generates device-specific configuration information for each policy enforcement point of the subset of policy enforcement points based on the set of network policies, wherein applying the network policies to the set of policy enforcement points comprises configuring each of the subset of policy enforcement points with the network management module in accordance with the generated device-specific configuration information.

14. The network system of claim 11, wherein the at least one processor of the network management device selects a subset of the first set of endpoint computing resources included in the first security domain as a security sub-domain, select a different set of network policies to apply to the security sub-domain, selects a second subset of the set of policy enforcement points based on the subset of endpoint computing devices that is required to enforce the different set of network policies against the subset of endpoint computing resources of the security sub-domain, and applies the different set of network policies to the second subset of policy enforcement points in order to enforce the different set of network policies against the subset of endpoint computing resources of the security sub-domain.

15. The network system of claim 14, wherein the at least one processor of the network management device determines whether one or more network policies of the different set of network policies conflicts with one or more network policies of the set of network policies, and, in response to determining that one or more network policies of the different set of network policies conflicts with one or more network policies of the set of network policies, prevents the conflicting network policies from being applied to the second subset of policy enforcement points.

16. The network system of claim 11, wherein the at least one processor of the network management device receives updated physical network topology information, determine that one or more endpoint computing resources of the first security domain moved to a different location within the network based on the updated physical network topology information, automatically determines a different set of policy enforcement points required to enforce the network policies against the first set of endpoint computing resources of the security domain based on the updated physical network topology information, and applies the network policies to the different set of policy enforcement points in order to enforce the network policies against the first set of endpoint computing resources of the security domain.

17. The network system of claim 16, wherein the at least one processor of the network management device determines that no configuration changes need to be made to the different set of policy enforcement points in order to apply the network policies to the different set of policy enforcement points.

18. The network system of claim 11, wherein the network policies regulate network traffic between the first security domain and the second security domain.

19. The network system of claim 11, wherein the first set of endpoint computing resources includes one or more of a computer user account, a computer file, a computer file directory, a computer application, a computer, a printer, and a scanner.

20. The network system of claim 11, wherein the set of policy enforcement points includes one or more of a firewall, an intranet controller, a secure socket layer (SSL) virtual private network (VPN) gateway, a radius server, a subscriber resource device, and a unified access control (UAC) device.

21. A computer-readable storage medium encoded with instructions for causing one or more programmable processors of a network management system to:
receive business policy graph information that defines a business policy graph of a network, wherein the business policy graph comprises a first set of endpoint computing resources configured as a first security domain and a second set of endpoint computing resources configured as a second security domain without an indication of any policy enforcement points within the network, wherein the first set of endpoint computing resources includes computing resources physically located at two or more different geographic locations, wherein the second set of endpoint computing resource includes at least one computing device physically located at one of the two or more different geographic locations at which the set of endpoint computing resources is located, and wherein each of the two or more different geographic locations is associated with at least one respective policy enforcement point of a set of policy enforcement points;

receive an indication of a set of network policies to apply to the first security domain and the second security domain, wherein a first portion of the network polices applied to the first security domain is different from a second portion of the network policies applied to the second security domain;

automatically determine, based on physical network topology information readable by the network management system, one or more policy enforcement points of the set of policy enforcement points, the one or more policy enforcement points being required to enforce the network polices against the first set of endpoint computing resources of the first security domain and the second set of endpoint computing resources of the second security domain, and wherein the physical network topology information includes information about the location of the first and second sets of endpoint computing resources and the set of policy enforcement points within the network; and apply the network policies to the one or more policy enforcement points of the set of policy enforcement points in order to enforce the network policies against the first set of endpoint computing resources of the first security domain and the second set of endpoint computing resources of the second security domain.

22. The method of claim 1, wherein automatically determining, with the network management system, one or more policy enforcement points of the set of policy enforcement points based on physical network topology information readable by the network management system comprises:
determining, with the network management system, a location of each endpoint computing resource of the first security domain within the network based on the physical network topology information readable by the network management system;
determining, with the network management system, a location of each endpoint computing resource of the second security domain within the network based on the physical network topology information readable by the network management system; and
determining, with the network management system, a respective policy enforcement point of the set of policy enforcement points required to enforce the network polices against each endpoint computing resource of the first security domain and the second security domain.

* * * * *